United States Patent Office 3,388,093
Patented June 11, 1968

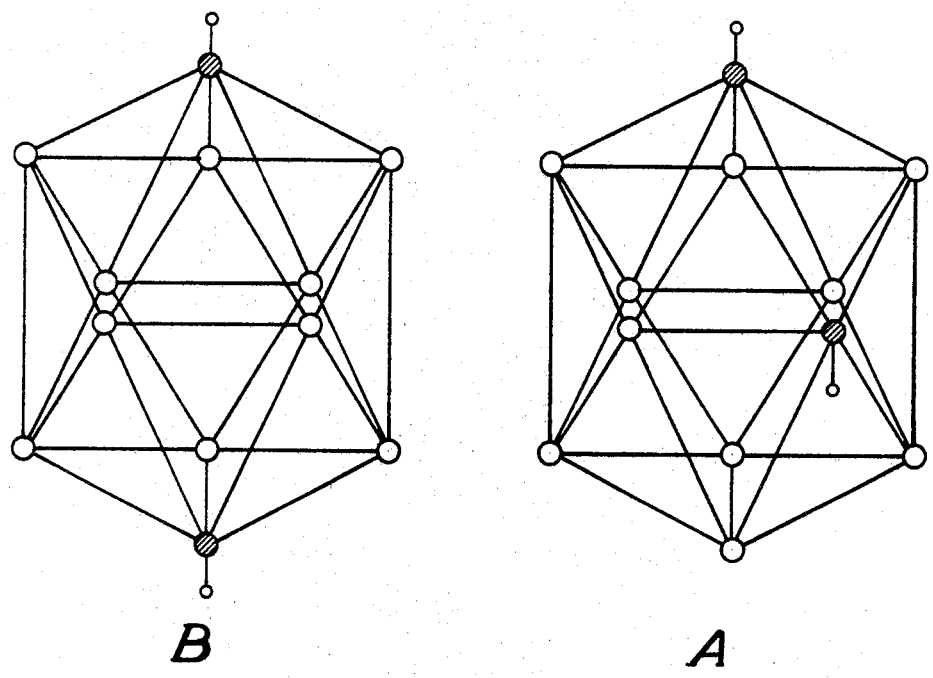

3,388,093
RESINS AND ELASTOMERS FROM SILOXY CARBORANYL POLYMERS
Theodore L. Heying, North Haven, Stelvio Papetti, Hamden, and Otto G. Schaffling, Cheshire, Conn., assignors to Olin Mathieson Chemical Corporation, a corporation of Virginia
Filed June 21, 1965, Ser. No. 465,437
13 Claims. (Cl. 260—37)

ABSTRACT OF THE DISCLOSURE

Polymers having recurring structural units of the formula:

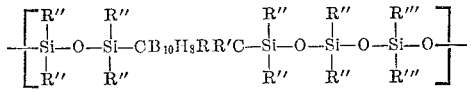

where R and R' are hydrogen or alkyl of from 1 to 5 carbon atoms and R'' and R''' are independently selected alkyl of from 1 to 6 carbon atoms or aryl of not more than 8 carbon atoms are prepared by reacting a bis(halotetraorganosiloxanyl) m-carborane or p-carborane with a dialkoxy silane in the presence of a catalyst.

---

This invention relates to novel polymers containing both boron and silicon and to a method for their preparation. More particularly, this invention relates to polymers prepared by reacting a dialkoxy silane with a bis(halotetraorganodisiloxanyl) organo m-carborane in the presence of a catalyst.

The novel linear polymers of this invention contain a multiplicity of structural units of the following formula:

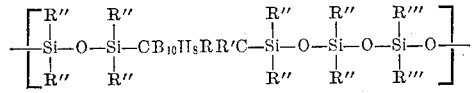

where R and R' are each selected from the group consisting of hydrogen and alkyl of from 1 to 5 carbon atoms, each R'' is independently selected from the group consisting of alkyl of from 1 to 6 carbon atoms and aryl of not more than 8 carbon atoms and each R''' is independently selected from the group consisting of alkyl of from 1 to 6 carbon atoms and aryl of not more than 8 carbon atoms. The —CB$_{10}$H$_8$RR'C— unit is derived from the meta isomer of carborane (i.e., m-carborane or neocarborane) which has the formula:

HCB$_{10}$H$_{10}$CH

The structural formula of m-carborane is shown as Formula A in the figure. The novel polymers of this invention can also be prepared from suitable derivatives of para-carborane (i.e., p-carborane). The structural formula of p-carborane is shown as Formula B in the figure. In this specification the formula HCB$_{10}$H$_{10}$CH is utilized to represent both m- and p-carborane.

In the method of this invention polymers containing both silicon and boron are prepared by the condensation of a compound of the formula:

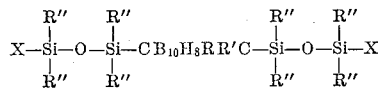

wherein R and R' are each selected from the group consisting of hydrogen and alkyl containing from 1 to 5 carbon atoms, each R'' is an independently selected alkyl of from 1 to 6 carbon atoms or aryl of not more than 8 carbon atoms and X is a halogen selected from the group consisting of chlorine, bromine and iodine with a dialkoxy silane of the formula:

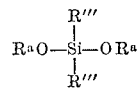

wherein R$^a$ is an alkyl group of from 1 to 6 carbon atoms and R''' is selected from the group consisting of alkyl of from 1 to 6 carbon atoms or aryl of not more than 8 carbon atoms.

Dialkoxy silane compounds useful as starting materials in the method of this invention include, for example,
dimethoxydimethylsilane,
dimethoxymethylethylsilane,
diethoxydimethylsilane,
diethoxydiethylsilane,
diethoxyethylisopropylsilane,
dipropoxydimethylsilane,
diisopropoxydimethylsilane,
dipropoxydiethylsilane,
dibutoxydimethylsilane,
dibutoxydiethylsilane,
dibutoxydipropylsilane,
diisobutoxydibutylsilane,
diethoxydipentylsilane,
dipropoxydipentylsilane,
dipropoxymethylpentylsilane,
dipropoxydihexylsilane,
dimethoxydiphenylsilane,
dibutoxydiphenylsilane,
diisopropoxydiphenylsilane,
dipropoxyditolylsilane,
dibutoxyditolylsilane,
dihexoxyditolylsilane,
diethoxydixylylsilane,
dipropoxydixylylsilane,
diisopropoxydixylylsilane, and
dibutoxydixylylsilane.

Included in the group of bis(halotetraorganodisiloxanyl) m-carboranes useful as starting materials are
bis(1,1,3,3-tetramethyl-3-chlorodisiloxanyl) m-carborane,
bis(1-ethyl-1-methyl-3,3-dipropyl-3-chlorodisiloxanyl) m-carborane,
bis(1,1,3,3-tetraethyl-3-chlorodisiloxanyl) m-carborane,
bis(1,1-diethyl-3,3-dipentyl-3-chlorodisiloxanyl) m-carborane,
bis(1,1,3,3-tetrapropyl-3-chlorodisiloxanyl) m-carborane,
bis(1,1,3-triisopropyl-3-hexyl-3-chlorodisiloxanyl) m-carborane,
bis(1,1,3,3-tetrabutyl-3-chlorodisiloxanyl-m-carborane, bis(1,1,3,3-tetrapentyl-3-chlorodisiloxanyl) m-carborane,
bis(1,1,3,3-tetraphenyl-3-chlorodisiloxanyl) m-carborane,
bis(1,1,3-trimethyl-3-xylyl-3-chlorodisiloxanyl) m-carborane etc.

The corresponding bromine and iodine derivatives as well as the corresponding p-carborane derivatives can also be employed as starting materials.

These compounds can be conveniently prepared by the method set forth in Papetti application Ser. No. 465,499, filed June 21, 1965. For example, the compound bis-(1,1,3,3 - tetramethyl - 3-chlorodisiloxanyl) m-carborane can be prepared by first reacting m-carborane with butyl lithium to form the corresponding dilithio-m-carborane which can then the reacted with 1,1,3,3-tetramethyl-1,3-dichlorodisiloxane to yield the desired m-carborane starting material.

In this invention the reaction proceeds as shown below, where for purposes of illustration, the reaction of diethoxy-dimethylsilane and bis(1,1,3,3-tetramethyl-3-chlorodisiloxanyl) m-carborane is shown:

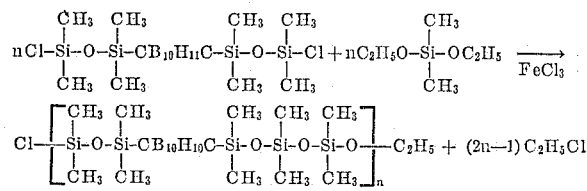

During the course of the reaction the alkyl chloride is given off and by measuring the gas evolved the extent of the reaction can be determined.

The temperature at which the reaction is carried out can be varied widely from about 75° to about 250° C. and preferably will be from about 125° to about 250° C. By varying the reaction time and temperature a wide variety of products ranging from liquids to rubbery materials with physical properties which vary widely can be prepared. The reaction time can be varied over a wide range and generally will be from about 0.5 hour to about 5 hours or more depending on the reaction conditions and particular reactants employed. Higher temperatures have been investigated for this reaction, but they do not accelerate the rate and temperature above about 250° C. must be avoided since the activity of the catalyst is slowly destroyed at such high temperatures.

The polymeric products of this invention range from liquids to completely rubbery materials. By the process of this invention products having molecular weights from about 2,000 to about 100,000 or more can be conveniently prepared. Liquid products of this invention are generally soluble in a wide variety of organic liquids such as ethers, ketones and aromatic hydrocarbons, as exemplified by diethyl ether, N-methyl-2-pyrrolidone, methyl ethyl ketone, Decalin, chlorobenzene, o-dichlorobenzene, bromobenzene, aniline and xylene. The rubbery materials are insoluble or only partially soluble in organic solvents depending on the degree of polymerization. Thus, by the process of this invention one may obtain useful rubbery products which are not tacky and which are insoluble in organic solvents.

The amount of the ferric chloride catalyst can be varied from about 0.01 to about 10 mole percent, based on the number of moles of the m- or p-carborane starting compound employed and preferably will be from about 0.05 to about 3.0 mole percent on the same basis. If during the course of the reaction, the rate of reaction decreases to a low level, or if the reaction ceases, it can be reinitiated by adding an additional quantity of ferric chloride. Elimination of the catalyst from the solid polymer product can be accomplished by a number of methods, such as by cutting the product into small sections and washing it with acetone or a mixture of acetone and water in which the higher polymer is practically insoluble. The catalyst can be removed from the liquid polymers by dissolving the product in benzene or diethyl ether followed by washing with water. Recovery of the purified polymer is accomplished by evaporating the benzene or ether layer to dryness.

For those products soluble in organic solvents, the molecular weight can be determined by the differential vapor pressure technique at 100° and 130° C. using as a medium o-chlorobenzene or any other suitable material. It has been found that in order to obtain a high molecular weight material, it is necessary to use relatively pure starting materials and to react about one mole of the bis-(tetraalkylhaloidsiloxanyl) m-carborane with each mole of the dialkoxy silane employed.

The elastic, soft, rubbery-type, polymeric materials of this invention prepared by reacting a dialkyldialkoxysilane with a bis(dihalotetraalkyldisiloxanyl) m-carborane can be cured (or vulcanized) to rubbery products which have remarkable physical properties. For example, cured product prepared from the novel polymers of this invention after being heated in air for as long as 6 hours at 400° C. retain their excellent, rubber-like characteristics and exhibit no oxidation effects.

The polymers of this invention are cured by heating for about 10 minutes to about 30 hours or more at a temperature of from about 70° C. to about 300° C. The curing or vulcanizing process is carried out in the presence of an organic peroxide catalyst, a sulfur-containing curing agent or catalyst or combination of a sulfur-containing curing agent and sulfur. Pressure from about 100 p.s.i. to about 10,000 p.s.i. are also preferably employed.

Suitable peroxide catalysts include capryl, lauryl, benzoyl, dicumyl, methyl ethyl ketone, and di-t-butyl peroxide, t-butyl hydroperoxide and cumene hydroperoxide, or any other peroxide or hydroperoxide which has a long enough half life to ensure curing at the elevated temperatures employed. The preferred quantity of peroxide will be between 0.2 percent and 5 percent based on the polymer weight. Among the most useful peroxides are those with the longest half lives at the most useful curing temperature range which is between about 100° and about 150° C. Such peroxides are exemplified by dicumyl, methyl ethyl ketone, and di-t-butyl peroxide, t-butyl hydroperoxide, cumene hydroperoxide, and 2,5-bis-(tert.-butylperoxy)-2-5-di-methylhexane. Peroxides with short half-lives, such as benzoyl peroxide, dichlorobenzoyl peroxide, etc., in the 120° and 150° C. temperature range can be utilized if longer curing times at these lower temperatures can be tolerated.

Sulfur-containing curing agents suitable for use with the polymers of this invention include benzothiazole-2-thiol 2,2'-benzothiazyl disulfide, zinc benzothiazyl sulfide, tetramethylthiurammonosulfide, di-N-pentamethylene thiuramtetrasulfide, piperidinium - N-pentamethylenedithiocarbamate, zinc dibenzyldithiocarbamate, bismuth dimethyldithiocarbamate, lead dimethyldithiocarbamate, tellurium diethyldithiocarbamate, zinc dibutyldithiocarbamate, zinc butyl xanthate, and dibutyl xanthogen disulfide. Sulfur in an amount up to about six times the weight of the sulfur-containing curing compound, if desired, can also be utilized in preparing cured products from the novel polymers of this invention. Generally the combined weight of the sulfur and the sulfur-containing curing agent employed will be from about 0.5 percent to about 10 percent of the weight of polymer being cured with the minimum amount of the sulfur-containing curing agent being not less than 0.5 percent of the weight of the polymer.

Oxides of the lead, mercury and zinc, glass fiber, silica fiber, talc, asbestos, etc., can be used as reinforcing agents or fillers for the polymers of this invention. In addition, pigment type fillers such as titanium dioxide, carbon black, lithiopone and iron oxide, can also be employed.

Finely divided silica of all types, such as precipitated silica, etc., is especially valuable as a filler or reinforcing agent for use with the polymers of this invention. Silica having a particle size of from about 0.005 micron to about 0.050 micron is particularly useful as a reinforcing agent and filler.

The amount of the reinforcing agent or filler utilized will vary from about 5 to about 400 percent by weight based on the weight of the linear polymeric condensation product employed.

The polymeric products of this invention are useful in a wide variety of applications such as for gaskets, O-rings, encapsulation materials, etc., especially where the ability to withstand elevated temperatures is required. These materials are especially valuable as heat resistant adhesives which are useful in preparing glass laminates for high temperature applications.

This invention is further illustrated, but not limited, by the examples which follow:

Example I

Bis(1,1,3,3-tetramethyl-3-chlorodisiloxanyl) m-carborane (29.58 g., 0.062 mole), diethoxydimethylsilane (9.18 g., 0.062 mole) and 2 mole percent of anhydrous ferric chloride (based on the total number of moles of the m-carborane compound employed) were added to a 300 ml., single-necked flask equipped with a condenser, stirring bar and a nitrogen inlet line. The reaction flask was placed in oil bath and heated and a substantial quantity of gas was evolved between 100–150° C. (oil bath temperature). After the gas evolution had ceased, the resulting product was a dark, viscous liquid. An additional quantity of anhydrous ferric chloride (1 mole percent based on the total number of moles of neocarborane compound employed) was added to the liquid product and the mixture was heated at 180° C. After 25 minutes at this temperature, the initial liquid product became a rubbery material after which heating was continued for an additional 10 minute period.

Vacuum was applied to the reaction flask for about 10 minutes (0.1 mm. Hg—temperature 180° C.) to eliminate volatile materials. The final product, an elastic material, was practically insoluble in ether, acetone, dioxane, benzene and xylene.

The polymeric product, which was obtained in essentially quantitative yield, was analyzed for carbon, hydrogen, boron and silicon and the following results were obtained:

Calc'd for $C_{12}H_{40}B_{10}O_4Si_5$: C, 29.00; H, 8.11; B, 21.77; Si, 28.25. Found: C, 28.61; H, 8.18; B, 21.13; Si, 29.14.

On the basis of the elemental analysis and on infrared analysis it was determined that the product consisted essentially of recurring units of the formula:

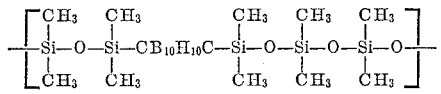

Example II

Bis(1,1,3,3-tetramethyl-3-chlorodisiloxanyl) m-carborane (24.31 g., 0.0590 mole), diphenyldimethoxysilane (12.43 g., 0.0509 mole) and 2.5 mole percent of anhydrous ferric chloride (based on the total number of moles of the carborane compound employed) were added to 100 ml., single-necked flask equipped with a condenser, stirring bar and a nitrogen inlet line.

The reaction flask was placed in oil bath and heated. At 100–160° (oil bath temperature) a substantial quantity of the gaseous methyl chloride was evolved. Heating at higher temperature did not result in any additional appreciable gas evolution. The viscous, liquid polymeric product obtained was placed under vacuum at 180° C. for about 10 minutes in order to eliminate volatile materials. The product was dissolved in 200 ml. of ethyl ether and the resulting solution was washed with three 100 ml. portions of water to eliminate the ferric chloride after which the ether was removed by evaporation. The resulting residue, a very viscous, light brown, transparent, liquid polymer, was placed under vacuum at temperatures above 200° C. for about 10 minutes and then heated for about 30 minutes at 300° C. (atmospheric pressure) yielding a rubbery product. This elastomeric material was practically insoluble in ether, acetone, benzene, and xylene.

The polymeric product was analyzed for carbon, hydrogen, boron and silicon and the following results were obtained:

Calc'd for $C_{22}H_{44}B_{10}O_4Si_5$: C, 42.54; H, 7.14; B, 17.40; Si, 22.61. Found: C, 41.58; H, 7.45; B, 17.54; Si, 22.90.

From the elemental analysis and infrared analysis it was determined that the product consisted essentially of recurring units of the formula:

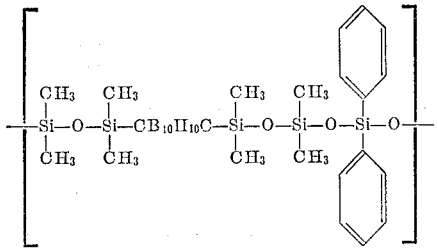

Example III

Bis(1,1,3,3-tetramethyl-3-chlorodisiloxanyl) m-carborane (16.35 g., 0.034 mole), diphenyldimethoxysilane (8.35 g., 0.034 mole) and 1 mole percent of anhydrous ferric chloride (based on the total number of moles of the carborane compound employed) were added to a 100 ml., single-necked flask equipped with a condenser, stirring bar and a nitrogen inlet line.

The reaction flask was placed in an oil bath, heated to a temperature of 140° C. and maintained at that temperature until the evolution of gas had substantially ceased. An additional quantity of (1 mole percent based on the weight of the carborane compound employed) of anhydrous ferric chloride was added and the mixture heated to 180° C. Since very little gas was evolved, heating was discontinued and the product allowed to cool to room temperature.

The resulting product, a viscous liquid, was dissolved in 200 ml. of ethyl ether and washed with three 100 ml. portions of water. The ether was removed from the ether solution by evaporation yielding, as a residue, a light brown, transparent, viscous, polymeric, liquid product. The molecular weight was determined by the differential vapor pressure technique at 100° C. in chlorobenzene and found to be of 3398.

Volatile materials were removed from the product by holding the product under vacuum at about 200° C. for 10 minutes after which it was heated at about 300° C. for 30 minutes (atmospheric pressure) yielding an elastomeric material which was practically insoluble in ether, acetone, dioxane, benzene and xylene.

Analysis of the polymeric product for carbon, hydrogen boron and silicon gave these results:

Calc'd for $C_{22}H_{44}B_{10}O_4Si_5$: C, 42.54; H, 7.14; B, 17.40; Si, 22.61. Found: C, 41.58; H, 7.47; B, 17.54; Si, 22.90.

On the basis of the elemental analysis and on infrared analysis it was determined that the product consisted essentially of recurring units of the formula:

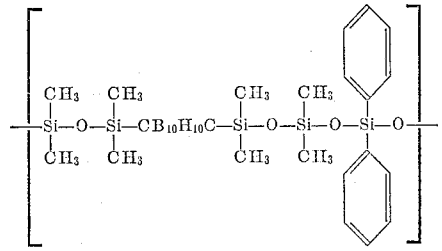

Example IV

Four grams of the polymer prepared in Example I was milled with 1.0 g. of silica having a particle size of about 0.015 micron and 0.080 g. of benzoyl peroxide. The milled composition was placed in a 2-inch diameter round mold and maintained under 1000 p.s.i. pressure at 130° C. for one hour yielding a soft, very elastic, translucent, dark-brown rubber. Post-curing of this rubbery material by heating in air for 24 hours at 100° C., then for 24 hours at 150° C. and finally 48 hours at 200° C. yielded an elastic rubber product which was even more translucent and possessed greater tensile strength than the starting material.

Example V

Four grams of the polymer prepared in Example II was milled together with 1.0 g. of silica having a particle size of 0.015 micron and 0.080 g. of benzoyl peroxide. The milled composition was placed in a 2-inch diameter, round mold and maintained under 1250 p.s.i. pressure at approximately 130° C. for one hour after which the mold and contents were allowed to cool to room temperature under pressure. A translucent, elastic rubber product was obtained.

Example VI

Fifteen grams of the polymer prepared in Example II was milled together with 3.75 g. of silica having a particle size of 0.015 micron and 0.300 g. of benzoyl peroxide. The milled composition was placed in a 5.25 inch x 2 inch mold and maintained under a pressure of 1000 p.s.i. for approximately 130° C. for 4 hours and then allowed to cool under pressure. A very soft, elastic rubber product with excellent flow characteristics was obtained. This product was post-cured by heating in air for 24 hours at 100° C., then 24 hours at 150° C. and finally for 36 hours at 200° C., yielding an excellent rubbery material having a Shore A hardness of 58 and a tensile strength of 251 p.s.i. (106 percent elongation) at ambient temperature.

A sample of the post-cured product which had been heated for 6 hours at 400° C. in air retained unimpaired its rubbery properties and in addition showed no oxidation effects.

Example VII 10.0 g. of polymer prepared as described in Example I is milled together with 2.5 g. of silica (Cab-O-Sil M–5) having a particle size of 0.015 micron and 0.2 g. of dicumyl peroxide (40 percent by weight on calcium carborate). The milled polymer composition is then placed in a 5¼ inch x 2 inch mold and maintained under 500 p.s.i. pressure for 1 hour at 150° C. yielding a soft, elastic rubber. Post-curing of the product for twenty-four hours at 100° C., thirty-six hours at 150° C. and forty-eight hours at 200° C. yields an elastic rubber of tensile strength higher than the starting material.

Example VIII 10.0 g. of polymer prepared as described in Example II is milled together with 5.0 g. of silica having a particle size of about 0.015 micron and 0.15 g. of 2,5-bis(tert.-butylperoxy)-2,5-dimethylhexane. The milled polymer composition is placed in a 5¼ inch x 2 inch mold and kept at 1000 p.s.i. pressure for about one to two hours at 165° C. The cured product is then allowed to cool under pressure yielding a very elastic, soft rubber. Post-curing of this product as described in Example VII results in the formation of an elastic, rubbery product with improved tensile strength over that of the starting material.

Example IX 15 g. of the polymer prepared in Example I was milled together with 3.75 g. of silica having a particle size of about 0.015 micron and 0.30 g. of benzoyl peroxide. The mixed polymer composition was then loaded into a 5¼ x 2 inch mold, pressed in a preheated press to 1000 p.s.i. and vulcanized at 130° C. for 5 hours. The result was a well-molded, soft, elastic, translucent rubbery product. This material was post-cured by allowing it to stand at ambient temperature followed by heating for two days at 100° C., heating for one day at 150° C. and finally heating for three days at 200° C., giving an elastic, rubbery product with excellent physical properties.

The post-cured product was tested for modulus of rigidity at low temperatures using a Tinius Olsen torsion stiffness tested. During the testing period the sample was cooled with a mixture of liquid nitrogen and low boiling petroleum ether. The following results were obtained:

| Temperature, °C. | Modulus of rigidity, p.s.i. |
|---|---|
| −75 | 700 |
| −90 | 11,300 |
| −100 | 68,900 |

In these tests the polymeric product retained its rubber-like properties and, from the modulus values obtained, the outstanding low temperature properties of this material are clearly shown.

What is claimed is:

1. A curable, linear polymeric condensation product having essentially units of the structure:

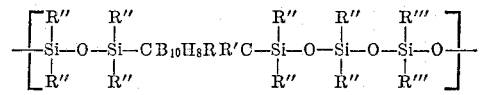

wherein R and R' are each selected from the group consisting of hydrogen and alkyl of from 1 to 5 carbon atoms, each R'' is independently selected from the group consisting of alkyl of from 1 to 6 carbon atoms and aryl of not more than 8 carbon atoms and each R''' is independently selected from the group consisting of alkyl of from 1 to 6 carbon atoms and aryl of not more than 8 carbon atoms, the said curable, linear polymeric condensation product having a molecular weight of from about 2000 to about 100,000.

2. The product of claim 1 wherein R and R' are hydrogen, each R'' is methyl and each R''' is methyl.

3. The product of claim 1 wherein R and R' are hydrogen, each R'' is methyl and each R''' is phenyl.

4. A curable composition comprising (A) a linear polymeric condensation product having essentially units of the structure:

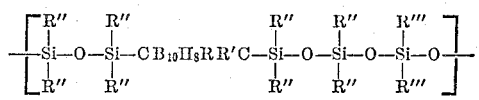

wherein R and R' are each selected from the group consisting of hydrogen and alkyl of from 1 to 5 carbon atoms, each R'' is independently selected from the group consisting of alkyl of from 1 to 6 carbon atoms and aryl of not more than 8 carbon atoms and each R''' is independently selected from the group consisting of alkyl of from 1 to 6 carbon atoms and aryl of not more than 8 carbon atoms, the said linear polymeric condensation product having a molecular weight of from about 2000 to about 100,000 and (B) an organic peroxide curing catalyst.

5. The curable composition of claim 4 wherein in the said units each R and R' is hydrogen and each R'' and R''' is methyl.

6. The curable composition of claim 4 wherein in the said units each R and R' is hydrogen, each R'' is methyl and each R''' is phenyl.

7. The curable composition of claim 4 wherein the said catalyst is benzoyl peroxide.

8. The curable composition of claim 4 wherein the said curing catalyst is dicumyl peroxide.

9. The curable composition of claim 4 wherein the said curing catalyst is 2,5-bis(tert.-butylperoxy)-2,5-dimethylhexane.

10. The curable composition of claim 4 wherein said composition contains from about 5 to about 400 percent of a reinforcing agent based on the weight of the linear polymeric condensation product.

11. The curable composition of claim 10 wherein the said reinforcing agent is silica having a particle size of from 0.005 micron to about 0.050 micron.

12. The curable composition of claim 10 wherein in the said units the R and R' substituents are hydrogen, the R'' substituents are methyl, the R''' substituents are phenyl, the said reinforcing agent is silica having a particle size of about 0.005 to about 0.050 micron and the said organic peroxide curing catalyst is benzoyl peroxide.

13. The product formed by curing the composition of claim 4.

References Cited
UNITED STATES PATENTS
3,247,257  4/1966  Green et al. _____ 260—606.5

OTHER REFERENCES

Anonymous, "Chem. & Eng. News," Dec. 9, 1963, pp. 62–70 relied upon.

S. Papetti and T. L. Heying, Inorg. Chem., 3(10) October 1964, pp. 1448–50.

K. A. Andrianov, "Polymers With Inorganic Main Chains." Dept. Com. Clearing house for Technical Federal Scientific and Technical Information, JPRS: 20, 272, 22 July 1963; pp. 250-60 relied upon.

W. S. Penn, Synthetic Rubber Technology, vol. 1, Maclaren and Sons Ltd. London, 1960, pp. 291–93 relied upon.

JULIUS FROME, *Primary Examiner.*

MORRIS LIEBMAN, *Examiner.*

J. E. CALLAGHAN, *Assistant Examiner.*